US011444969B2

(12) United States Patent
Chesla

(10) Patent No.: US 11,444,969 B2
(45) Date of Patent: Sep. 13, 2022

(54) SCORING THE PERFORMANCE OF SECURITY PRODUCTS

(71) Applicant: Cybereason Inc., Boston, MA (US)

(72) Inventor: Avi Chesla, Brookline, MA (US)

(73) Assignee: Cybereason Inc., Boston, MA (US)

( * ) Notice: Subject to any disclaimer, the term of this patent is extended or adjusted under 35 U.S.C. 154(b) by 238 days.

(21) Appl. No.: 16/909,353

(22) Filed: Jun. 23, 2020

(65) Prior Publication Data

US 2020/0322371 A1 Oct. 8, 2020

Related U.S. Application Data

(63) Continuation of application No. 15/227,571, filed on Aug. 3, 2016, now abandoned.

(51) Int. Cl.
*H04L 29/06* (2006.01)
*H04L 9/40* (2022.01)
*G06F 16/2457* (2019.01)

(52) U.S. Cl.
CPC .... *H04L 63/1433* (2013.01); *G06F 16/24578* (2019.01)

(58) Field of Classification Search
CPC .............. G06F 16/24578; H04L 63/1433
See application file for complete search history.

(56) References Cited

U.S. PATENT DOCUMENTS

| | | | | |
|---|---|---|---|---|
| 7,933,989 B1 ‡ | 4/2011 | Barker | ............... | H04L 63/1416 709/22 |
| 7,975,286 B1 * | 7/2011 | Fickey | ................... | H04L 63/20 726/4 |
| 8,150,783 B2 ‡ | 4/2012 | Gonsalves | ............ | G06N 7/005 706/10 |
| 8,515,950 B2 ‡ | 8/2013 | Gao et al. | ......... | G06F 17/30867 707/723 |
| 8,572,750 B2 ‡ | 10/2013 | Patel | ...................... | G06F 21/53 726/25 |
| 8,800,045 B2 ‡ | 8/2014 | Curtis | ................. | H04L 63/1441 726/25 |

(Continued)

OTHER PUBLICATIONS

The International Search Report and The Written Opinion of the International Searching Authority for PCT/US2015/060109, ISA/RU, Moscow, Russia, dated Mar. 10, 2016.‡

(Continued)

*Primary Examiner* — Richard A McCoy
(74) *Attorney, Agent, or Firm* — DLA Piper LLP (US)

(57) ABSTRACT

A method and system for scoring performance of a security product are provided. The method includes receiving security product performance data of the security product configured to handle a specific cyber threat; classifying the performance data into a product profile associated with the security product; computing at least one security product performance score for the product profile based on the classified product security performance data; and associating the at least one security performance score with the product profile. In an embodiment, the method also includes selecting the at least one security product from a plurality of security products based on their respective performance scores for the respective cyber threat.

7 Claims, 6 Drawing Sheets

(56) References Cited

U.S. PATENT DOCUMENTS

| | | | | |
|---|---|---|---|---|
| 9,338,181 | B1 ‡ | 5/2016 | Burns | H04L 63/1433 |
| 2004/0114519 | A1 ‡ | 6/2004 | MacIsaac | H04L 63/1441 370/23 |
| 2004/0143756 | A1 ‡ | 7/2004 | Munson | G06F 21/55 726/23 |
| 2004/0250124 | A1 ‡ | 12/2004 | Chesla | G06F 21/552 726/13 |
| 2008/0066156 | A1 * | 3/2008 | Ikeda | H04L 63/0876 726/3 |
| 2008/0086772 | A1 ‡ | 4/2008 | Chesla | H04L 63/145 726/23 |
| 2009/0254993 | A1 * | 10/2009 | Leone | H04L 63/1433 455/418 |
| 2009/0307776 | A1 * | 12/2009 | Curnyn | H04L 63/1408 726/24 |
| 2012/0096549 | A1 ‡ | 4/2012 | Amini | H04L 63/1433 726/23 |
| 2012/0304007 | A1 ‡ | 11/2012 | Hanks | G05B 23/0216 714/26 |
| 2013/0081142 | A1 ‡ | 3/2013 | McDougal | G06F 21/554 726/24 |
| 2013/0139214 | A1 * | 5/2013 | Chesla | H04L 63/1441 726/1 |
| 2013/0198840 | A1 ‡ | 8/2013 | Drissi | H04L 9/0891 726/22 |
| 2013/0276122 | A1 ‡ | 10/2013 | Sowder | G06F 21/00 726/24 |
| 2014/0215618 | A1 ‡ | 7/2014 | Striem Amit | G06F 21/552 726/23 |
| 2014/0283026 | A1 ‡ | 9/2014 | Striem Amit | H04L 63/1416 726/22 |
| 2014/0283050 | A1 ‡ | 9/2014 | Striem Amit | H04L 63/1425 726/23 |
| 2014/0337974 | A1 ‡ | 11/2014 | Joshi | H04L 63/1425 726/23 |
| 2015/0089566 | A1 ‡ | 3/2015 | Chesla | H04L 63/20 726/1 |
| 2015/0156086 | A1 ‡ | 6/2015 | Chesla | H04L 43/04 709/224 |
| 2015/0207809 | A1 * | 7/2015 | Macaulay | H04L 63/1433 726/22 |
| 2016/0156656 | A1 ‡ | 6/2016 | Boggs | H04L 63/1433 726/25 |
| 2016/0203319 | A1 * | 7/2016 | Coen | H04L 63/20 726/25 |

OTHER PUBLICATIONS

The International Search Report and the Written Opinion of the International Searching Authority for PCT/US2015/039664, ISA/RU, Moscow, Russia, dated Oct. 15, 2015.‡

\* cited by examiner
‡ imported from a related application

SCORING THE PERFORMANCE OF SECURITY PRODUCTS

CROSS-REFERENCE TO RELATED APPLICATIONS

This application is a continuation of U.S. patent application Ser. No. 15/227,571 filed on Aug. 3, 2016, the contents of each which is hereby incorporated by reference.

TECHNICAL FIELD

The present disclosure relates generally to cyber security systems, and more particularly to scoring performance for different security products.

BACKGROUND

The Internet provides access to a variety of information, applications, services, and vehicles for publishing information. Today, the Internet has significantly changed the way we access and use information and services (e.g., banking, e-commerce, e-trading, and the like). In order to access such services, users often share personal information with service providers. Similarly, confidential information of companies is stored on systems that are connected to the Internet. Recently, the frequency and complexity level of cyber-attacks has increased with respect to attacks performed against all organizations including, but not limited to, cloud providers, enterprises, organizations, and network carriers.

To secure their systems, infrastructure, and services, organizations utilize many different security products provided by different vendors. Typically, such products are utilized to detect and/or mitigate different vulnerabilities or threats. As an example, an enterprise network can implement one security product for an intrusion detection system (IDS) and another product for detecting malware download. Particularly, a typical enterprise network will be protected by firewalls, anti-virus software, malware detection software, authentication and authorization systems, intrusion detection, anti-phishing systems, network and end point behavior analysis, data leak prevention systems, web application firewalls (WAFs), and so on.

The security products are typically deployed in different segments of the enterprise network, e.g., at different servers, end-points (client computers), networks, and so on. Further, similar products from different vendors, can typically be utilized in combination to enhance security. For example, IDS software provided by both Cisco® and McAfee® can be installed to protect the same end-points and servers in the enterprise network against the same type of threats.

Security products typically utilize network behavior rules, attack signatures, malware and virus patterns and the like (collectively referred to as "security rules") to detect and/or mitigate a threat. Examples for such security rules include, e.g., IDS network attack signatures rules, anti-virus and malware patterns, reputation threat records, WAF rules, network behavior analysis rules, and so on. Each such rule is typically specific to a vendor providing the solution.

One of the challenges security architects and managers face is the multiplicity of security products and vendors. Each such product has a unique interface and implements a different type of technology, configurations, debug methods, and different security rules. The myriad of different security solutions and, specifically, their security rules pose a great challenge to protecting an enterprise network from cyber-attacks. In addition to the complexity in configuring and monitoring the different solutions, there is a real challenge in understanding the effectiveness of each security rule and, consequently, each solution. That is, it cannot be easily determined which solution, for example, is better over the other to detect a specific type of threat.

Consequently, integrating new solutions is complex and time consuming and requires a large security team with extensive expertise to master product complexity. As such, the administrative and maintenance labor comes at the expense of the design security defenses.

As a result, trying to enforce an overall effective security policy for the enterprise network is a very difficult task given the different nature of security rules. For example, assuming two IDS products are deployed in the network, and one detects a threat while the other does not. As such, there is an ambiguity as to whether the threat is real. Therefore, current solutions are inefficient when utilized to enforce an overall security policy.

In addition, the reliance on a specific security product typically discourages administrators to replace one product with another. Because typically in the chain of enforcing an overall security policy, an input of one product is an output security rule of another product. Therefore, replacing one such product in the chain would require replacing or at least reconfiguring of other products.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for scoring performance of a security product. The method comprises receiving security product performance data of the security product configured to handle a specific cyber threat; classifying the performance data into a product profile associated with the security product; computing at least one security product performance score for the product profile based on the classified product security performance data; and associating the at least one security performance score with the product profile.

Some embodiments disclosed herein also include a method for selecting a security product among a plurality of security products for protecting a protected entity. The method comprises for each of the plurality of security products: receiving security product performance data of the security product configured to handle a specific cyber threat; classifying the product performance data into a product profile associated with the security product; computing at least one security performance score for the product profile based on the classified security product performance data; associating the at least one security performance score with the product profile; and selecting at least one security product from the plurality of security products based on their respective performance scores.

Some embodiments disclosed herein also include a system for selecting a security product among a plurality of security products for protecting a protected entity. The system comprises a processing circuitry; and a memory, the memory containing instructions that, when executed by the processing circuitry, configure the system to: receive security product performance data of the security product configured to handle a specific cyber threat; classify the performance data into a product profile associated with the security product; compute at least one security product performance score for the product profile based on the classified product security performance data; and associate the at least one security performance score with the product profile.

Some embodiments disclosed herein also include a system for selecting a security product among a plurality of security products for protecting a protected entity. The system comprises a processing circuitry; and a memory, the memory containing instructions that, when executed by the processing circuitry, configure the system to: receive security product performance data of the security product configured to handle a specific cyber threat; classify the performance data into a product profile associated with the security product; compute at least one security product performance score for the product profile based on the classified product security performance data; and associate the at least one security performance score with the product profile.

Some embodiments disclosed herein also include a system for scoring performance of a security product. The system comprises a processing circuitry; and a memory, the memory containing instructions that, when executed by the processing circuitry, configure the system to: receive security product performance data of the security product configured to handle a specific cyber threat; classify the product performance data into a product profile associated with the security product; compute at least one security performance score for the product profile based on the classified security product performance data; associate the at least one security performance score with the product profile; and select at least one security product of the plurality of security products based on their respective performance scores.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
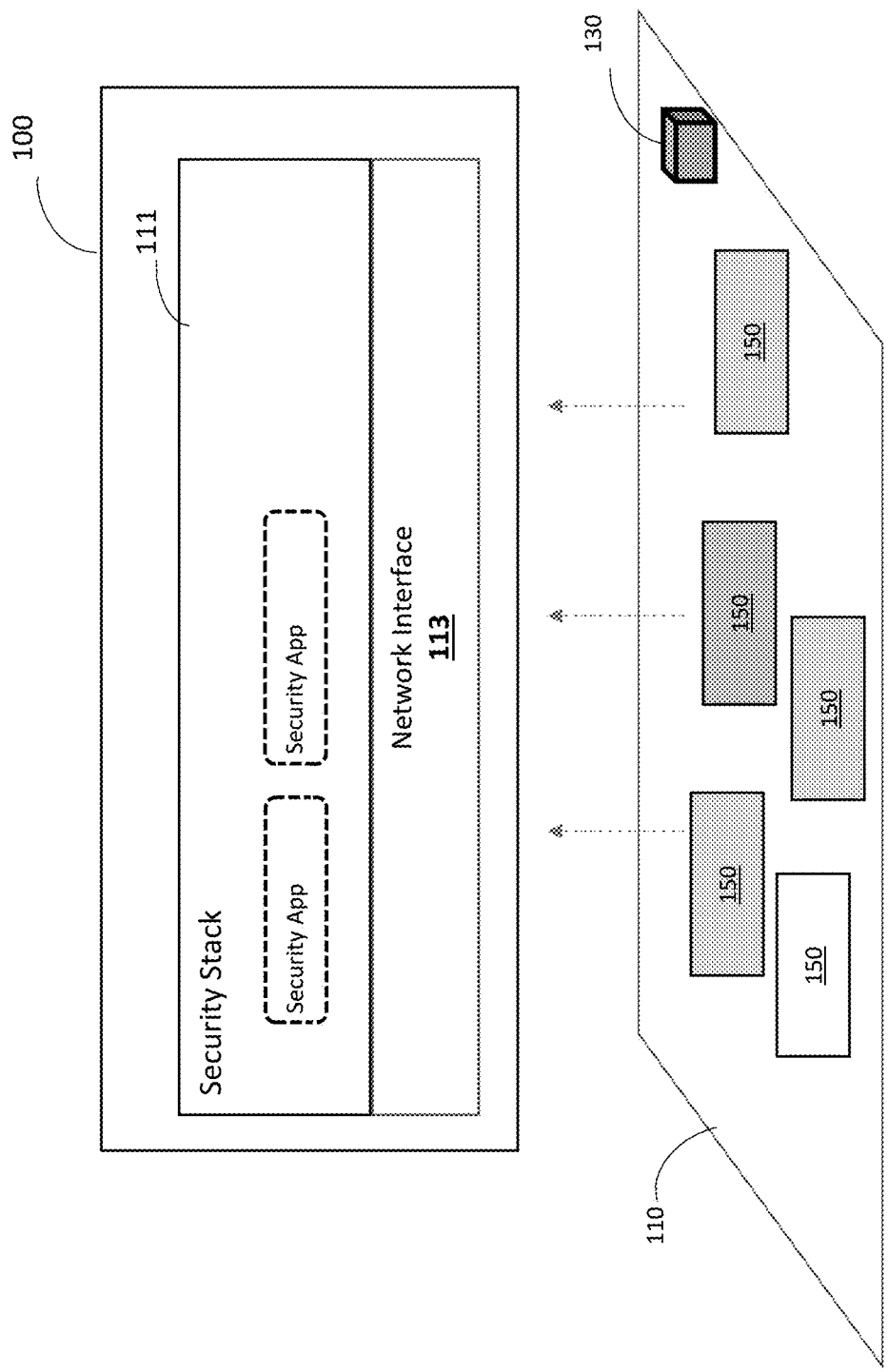
FIG. 1 is a diagram of a cyber-security system demonstrating the operation of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a method and system for scoring the performance of security products are disclosed. The security products may belong to the same cyber-solution category or to different categories. Each such category typically utilizes a different type of security technology, and thus supports different types of attack detection, attack investigation, and attack mitigation rules. Thus, according to an example embodiment, benchmarking of different security products by different vendors for the same category and against different threat types can be provided. As will be discussed below, the scoring can be of security rules stored in attack databases and attack logs generated during runtime by security products.

It should be appreciated that other than providing a real measure on how good a security product performs to protect against threat type; the disclosed embodiments can be utilized to select a specific product that would provide optimal defense against a specific type of threat. As noted above, in a typical organization, a number of different security products are deployed to protect the same segment of systems. Thus, selecting a product that would provide optimized protection reduces the numbers of alerts and/or logs that need to be reviewed by a user (e.g., a security analyst) as well as increasing the accuracy of protection. The benchmarking of security products further allows determination of which product demonstrates the best return on investment (ROI) and educated decisions on which products to keep, renew, or remove from the system.

In an embodiment, the benchmarking results are saved in a database or data warehouse providing a resources for security managers to take a decision which product to purchase, whether it is beneficial to replace an existing product for addressing a specific threat category, and so on. Such database or data warehouse can be accessed through a portal (not shown) that would include what-if decision engines, allowing security managers to evaluate the various security products. The engine can be further utilized to determine how each product can contribute for the overall performance of the security stack system's security applications for detection and mitigation of an attack campaign. Examples for such a campaign includes a ransomware campaign, a personal data-leak attack campaign, and so on.

In an example embodiment, a security service provides a unified abstract representation of security rules which is agnostic to the different products and vendors. The unified representation, and thus the security service, can be utilized in a security application that protects the overall enterprise network without being dependent on a specific security product. That is, one security product can be replaced by another without changing or reconfiguring such a security application.

FIG. 1 is an example diagram of a cyber-security system 100 demonstrating the operation of the disclosed embodiments. The cyber-security system 100 is configured to protect an entity (hereinafter a "protected entity") 130 communicatively connected in a network 110. The cyber security system 100 is also communicatively connected to the network 110. The network 110 may be, but is not limited to, a virtualized network, a software defined network (SDN), a hybrid network, a cloud services network, or any combination thereof. In an embodiment, the cyber-security system 100 is configured to operate in detection, investigation, and mitigation phases.

In an example configuration, the cyber-security system 100 includes a security stack system 111 and a network interface 113. The security stack system 111 is configured to control and execute the various phases to protect the protected entity 130. Specifically, the security stack system 111 is configured to create, control, program, and execute a plurality of security applications or "apps." In an embodiment, the security stack system 111 includes the classifier (not shown in FIG. 1) utilized to classify a plurality of attack protection rules and alerts of the various security products to the security services realized through the system 111. The operation of the security stack system 111 is discussed in greater detail herein below with respect to FIG. 2.

The network interface 113 provides an interface layer of the cyber-security system 100. Such communication can be with SDN-based network elements or "legacy" network elements (not shown) in the network 110. The network interface 113 supports bi-directional communication drivers to allow communication with the data-plane elements including configurations, policy read, and logs collection. The drivers support different forms of communication standards and vendor-defined interfaces such as Netconf, Netflow, BGP, BGP flow spec, SSH, CLIs, DB APIs and more. The drivers enable communication with middle-box devices (e.g., L4-L7 devices, DPI devices), end point devices (mobile, host based security applications), server applications, management systems of these devices, and so on.

The network interface 113 also interfaces with a plurality of security products 150. The security products 150 are typically designed to protect against cyber threats with different detection, investigation and mitigation techniques. A security product 150 maintains an attack database (not shown in FIG. 1) including security rules. As noted above, the security rules typically include attack signatures, malware and virus file patterns, malware OS related operation patterns and the like to detect a threat, mitigate a threat, or both. An attack database is frequently updated with new rules, modified rules, or both in order that the rules will be updated with the most recent threat intelligence about attack campaigns, new version of malware and viruses, and so on.

Following are non-limiting examples for cyber-solutions and associated rules stored in their attack databases. The cyber-solution is an anti-virus system and the respective security rules may include virus file patterns generated by anti-virus products, such as those provided by McAfee®, Symantec®, Blue Coat®, and the like. The cyber-solution is an IPS or IDS and the respective rules are network attack signatures generated by products such as those provided by Source Fire®, McAfee®, Snort®, and the like. The cyber-solution is an anti-malware system and the respective rules are known anti-malware file patterns and OS related malware action-patterns as provided by tools such as, but not limited to, FireEye®, Lastline®, and the like.

During runtime, a security product 150 generates attack logs identifying activity (malicious or non-malicious) detected in the network 110. An attack log is typically in a structured format that may vary from product to product. For example, a single log (e.g., file) may contain identified hosts, users, network address and the type of activity (e.g., event) detect by the security product 150. The attack logs are generated and input to the system 100 at runtime, i.e., when a security product 150 is active in detecting, investigating, or mitigating an on-going attack, or a combination thereof.

The system 100 is configured to orchestrate the operation of the various security products 150 through execution of a plurality of security applications (apps). In an embodiment, if two or more security products 150 are deployed to protect the entity 130 against the same threat (e.g., spyware or ransomware malware), either only one product will be selected for activating the protection for that purpose at a time or only logs associated with this threat from one product will be taken into account. The selection is based on a performance score, or scores generated or otherwise computed for each security product 150 and predefined selection criteria.

The performance score includes any of an offline score, a runtime score, a unified score, or a combination thereof. An offline score is based on the security-rules defined in an attack database (not shown) of a respective security product 150. As such attack database is typically populated with rules, the score can be computed as an off-line process and not based on the runtime operation of the product 150. It should be noted that, as the security rules in an attack database are updated, added, or removed, a new off-line score can be generated or computed. A runtime score is generated based on attack logs provided by a security product 150. A unified score is at least based on the off-line and run-time scores.

It should be noted that, for some security products 150, only a runtime score can be generated or otherwise computed. As an example, for a security product 150 having an attack database containing security rules that frequently change, an off-line score will not be generated.

Figure 2:
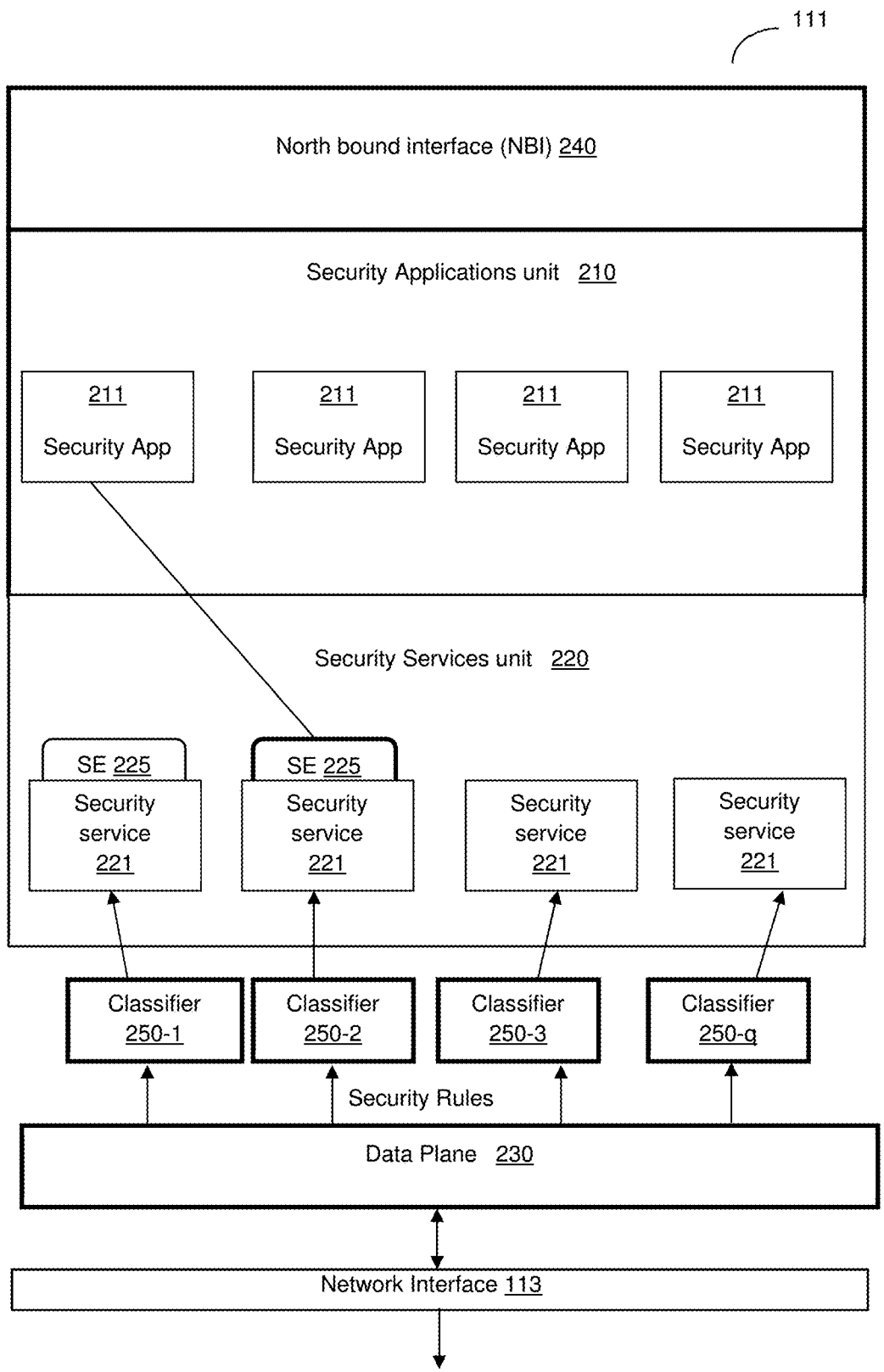
FIG. 2 is a block diagram of a security stack system according to an embodiment.

FIG. 2 shows an example block diagram of a security stack system 111 according to an embodiment. In an example implementation, the security stack system 111 includes a security applications unit 210, a security services unit 220, a data-plane unit 230, and a northbound interface (NBI) 240. The security stack system 111 includes security services 221 that are reusable across different security applications ("apps") 211. Thus, different security applications 211 (each security application 211 typically configured for a different purpose) can consume the same security services 221 for their own needs.

Specifically, the security applications unit 210 includes one or more security applications 211. Each security application 211 represents a different type of security protection including, for example, ransomware attack campaign detection and mitigation, intelligence gathering detection and mitigation, insider threat detection and mitigation, data-leaks, and so on. The modules or rules interfacing with a security application 211 provide the required services and security engines 225, thereby allowing the creation or otherwise updating of a security application 211 according to evolving security needs.

The security services unit 220 includes different types of security services 221. Each security service 221 is designed to serve one or more security applications 211. The security services 221 are also designed to provide efficient control and security data collection over security rules provided by the security products (150, FIG. 1). The classification of the security rules into the services 221 and one or more security engines (SEs) 225 of the services 221 is performed by corresponding classifiers 250 as discussed in detail below. Each security service 221 may include one or more preconfigured security engines 225.

Following are example security services 221 that can be maintained and executed by the security services unit 220. A first type of security service manages the resources of network behavior analysis (NBA) products. Such service classifies security capabilities of NBA products into a uniform set of protection functions (Security Engines) such as abnormal data transfer, network scanning, application scanning, brute force attack malware propagation, etc.

Another type of security service 221 allows for managing and analyzing multiple types of reputation sources (third party intelligence security sources). The reputation database maintains reputation information of network entities such as clients and services (sites). Such reputation information may be used to evaluate if these entities can possess a threat. A threat may be, for example, a phishing site, a command and control site, drop zone servers, sites that include malware software, and the like. The service classifies security capabilities of threat reputation feeds into a uniform set of protection functions (Security engines) such as phishing, C&C, drop-point, malware sites, and so on.

Another type of security service 221 allows for control of multiple types of anti-malware products in the network in order to analyze content such as web objects, mail attachments, executable files, and so on; and to identify anomalous code behavior. This service classifies security capabilities of anti-malware (mainly sand-box) products into a uniform set of protection function (Security engines) such as ransomware, droppers, memory scrapers, client spyware, etc.

Yet another type of security service 221 allows for management of multiple IDS and IPS devices. This service classifies security capabilities of IDS and IPS products into a uniform set of logical protection functions such as network scans, authentication brute-force, privileges escalation, malware, Command and control (C&C), a DoS, data-leak network patterns, and so on.

Yet another type of security service 221 generates real-time (RT) attack risk-chain patterns. These real-time attack risk-chain patterns represent network traffic patterns of attacks, such as user-based attacks (e.g., malware generated network traffic activities), server-based attacks (e.g., web scraping network activities, brute-force network activities, etc.) and network-based attacks (e.g., network Distributed Denial of Service (DDoS) attack network activities). These real-time attack risk-chain patterns can be used for real-time mitigation of threats, as well as for reputation and forensic analysis.

Some or all of the security services 221 may operate with a security engine 225. A security engine 225 is configured with a set of engine rules, either manually or automatically. In some cases, a user can modify and program new security engines 225 by defining a new set of engine rules.

It should be noted that programmability of the security stack system 111 allows a user to select different types of security services 221 and security engines 225, thereby providing a mix and match capability. Specifically, this capability is achieved by the security services 221, data plane unit 230, the classifiers 250, and a network interface module 113, all together which provides an abstraction layer for all underlining data-plane security products in the network and for threat intelligence DB (such as IDS, IPS, Anti-malware, NBA, reputation DB, WAF, and so on).

Information that is needed for operation of the security services 221 may be retrieved from the data-plane unit 230, from the north bound interface 240, or from both. It should be noted that the security services 221 in the security services unit 220 also communicate and interface with the security applications unit 210.

It should be further noted that the security services 221 listed above are merely examples, and that other security services can be utilized in the cyber-security system without departing from the scope of the embodiments disclosed herein. In various non-limiting embodiments, a programming language is provided in order to allow users to create and modify security applications and to create and modify the security engines included in each security service, as per business needs.

The data-plane unit 230 provides various functions that allow the security services to both analyze network information and enforce different control actions. Various services provided by the data plane unit 230 include topology discovery, data collection, QoS, and traffic copy and redirection services which include traffic distribution (L2, L3 load balancing for scaling out network resources), identity management service and so on.

Topology discovery involves interacting with the data-plane network elements, SDN controllers, and orchestration systems in order to retrieve network topology information.

The traffic copy and redirection services are designed to manage all network traffic redirection functions which include, but are not limited to, traffic redirection, smart traffic copying (copy based on L2-L4 traffic filter parameters), traffic distribution, and so on.

The data collection may involve collecting statistics data from probes deployed in the network and storing such statistics. The statistics collection may include, but are not limited to, network-based statistics from network elements; application-based network statistics from DPI resources (including middle-boxes and servers); and user-based statistics from network, DPI, middle boxes, and end-point resources. The collector services normalize the statistical information into a format that can be analyzed by the security services 221 in the security services unit 220. The QoS function involves interacting with a network and L4-L7 devices in order to enforce, for example, traffic rate-limiting. An identity management function involves interacting with identity management systems to provide name resolution services for the security services, map IP addresses to host, provide user names, and the opposite.

Also included in the security stack system 111 are a plurality of classifiers 250-1 through 250-*q* (hereinafter referred to individually as a classifier 250 and collectively as classifiers 250, merely for simplicity purposes) communicatively connected to the security services unit 220. Each classifier 250 is configured to classify security rules and attack logs of different security products related to the same category of a cyber-solution to a respective security service 221 and its security engines 225. For example, a cyber-solution of an IDS with a "network scan" protection would be an option. Thus, all security rules related to a network scan type of threat of the different security products are classified to the same service and a network scan security engine of this service. It should be noted that one security rule or attack log can be classified to one or more security services 221 and engines 225 and thus become processed by one or more classifiers 250.

In an embodiment, each classifier 250 is configured to normalize the security rules, attack logs, or both, to a unified representation. In an another embodiment, such normalization is performed by the network interface 113. The operation of a classifier 250 is discussed in greater detail herein below with reference to FIG. 5.

The north bound interface 240 interfaces between the security stack system 111 and one or more external systems (not shown). The external systems may include, for example, third party security analytics systems, security portals, datacenter orchestration control systems, identity management systems, or any other system that can provide information to the security stack system 111. This enables wider context-based security decision making processes. In an embodiment, the interfaces 240 may include standard interfaces, such as CLI, REST APIs, Web user interfaces, as well as drivers that are already programmed for control, configuration, or monitoring of specific third party systems, a combination thereof, and so on.

According to the disclosed embodiments, the operation of scoring security products and their security functions is performed by a security engine 225 operable in a service 221 designed to handle a specific cyber-solution category. For example, a security service 221 for an IDS can be configured with 3 different security engines, each of which handles a different threat (e.g., privileges escalation, a network scan, and a brute-force attack). Each engine 225 is configured to score the performance of each cyber-solution (e.g., solutions provided by Source Fire®, McAfee®, Snort®, etc.) deployed in the network and configured to handle the respective type of threat.

The scoring is performed based on a product profile (not shown in FIG. 2). The product profile includes all classified security rules of a specific product. The classified rules are in a unified format across the different products. Thus, the scoring is agnostic to a specific representation of product. The operation of a security engine 225 is further discussed herein below with reference to FIG. 3.

It should be noted that each of the security applications unit 210, the security services unit 220, the data plane unit 230, the north bound interface 240, and the classifiers 250, are communicatively interconnected through a predefined set of interfaces, APIs, or a combination of interfaces and APIs. It should be further noted that, in an embodiment, the security application unit 210, the security services unit 220, the classifier 250, and the data plane 230 in the security stack system 111 are independent. Thus, any changes in one unit or module do not necessarily result in any changes to the other modules.

Each, some, or all of the modules and the various units of the security stack system 111 may be realized by a processing circuitry (not shown). The processing circuitry may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry (not shown) may also include machine-readable media (not shown) for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
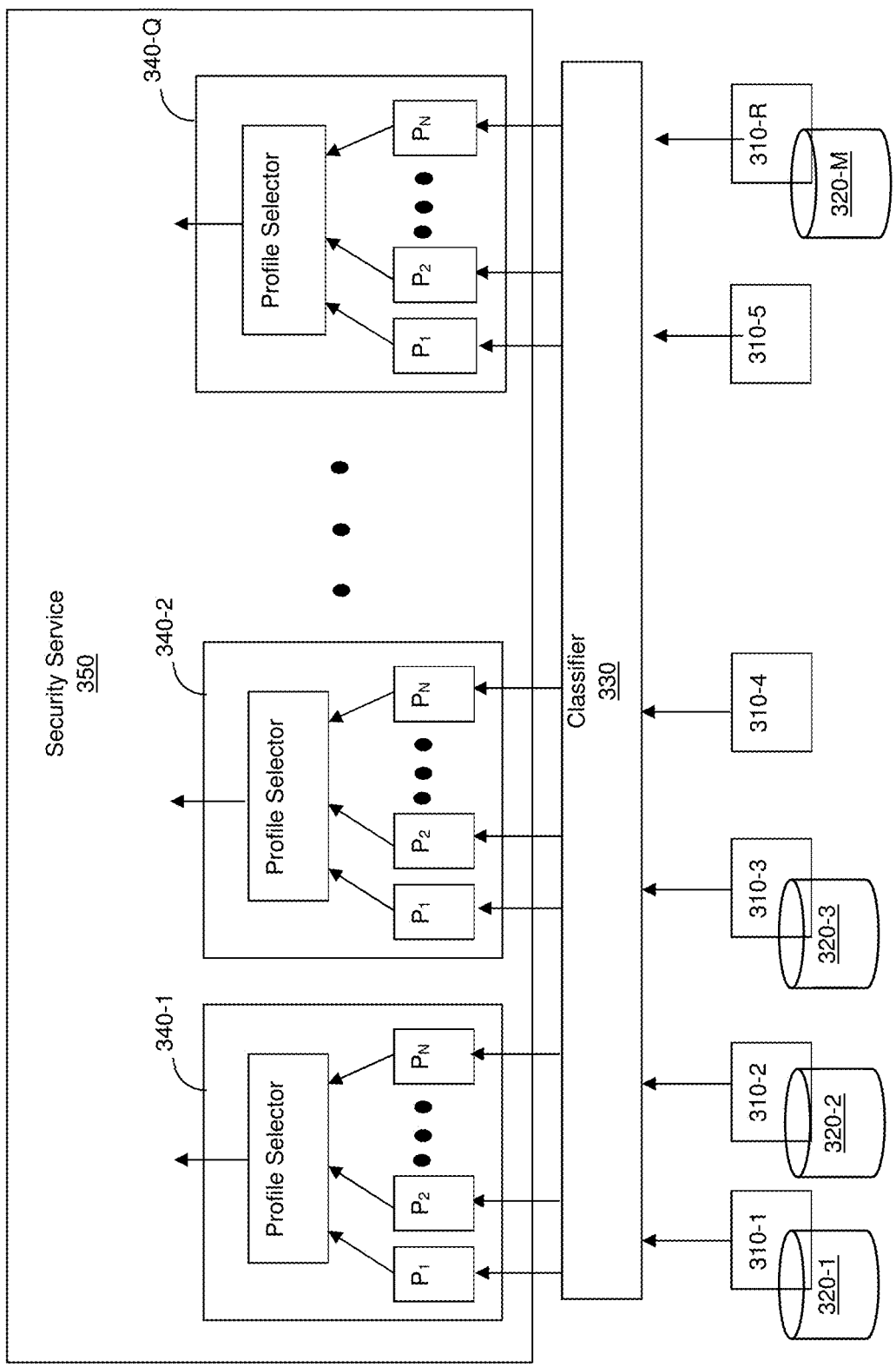
FIG. 3 is a diagram of a security service demonstrating the computation of the performance scores according to an embodiment.

FIG. 3 illustrates an example diagram of a security service 350 demonstrating the computation of the performance scores according to an embodiment. In the example shown in FIG. 3, a plurality of security products 310-1 through 310-R (hereinafter referred to individually as a security product 310 and collectively as security products 310, merely for simplicity purposes), some of which include an attack database of the attack databases 320-1 through 320-M, are analyzed by the security system 350. The rules in the databases 320-1 through 320-M are classified by a classifier 330 configured to generate product profiles ($P_1$, through $P_N$) stored in each of the security engines 340-1 through 340-Q (hereinafter referred to individually as a security engine 340 and collectively as security engines 340, merely for simplicity purposes) of a security service 350. In additional, attack logs output, in runtime, by the security products 310-1 through 310-R are also classified by a classifier 330 into the generated product profiles ($P_1$, through $P_N$).

Each security engine 340 is further configured to select a profile, and hence a security product, that demonstrates the best performance for handling a specific cyber-threat. Each security engine 340 can apply different selection criteria as discussed in greater detail below. A security engine 340 is configured to generate one or more of the offline, runtime, and unified scores.

The offline score is based on the security-rules defined in an attack database of a respective product. As such attack databases are typically populated with rules, the score can be computed as an offline process and not based on the runtime operation of a security product 310. It should be noted that as the security rules in an attack database are updated, added, or removed, a new offline score is generated.

The runtime score is generated or computed based on attack logs output by a security product 310. The attack logs are generated at runtime, i.e., when the security product 310 is active in detecting and/or investigating, of an on-going attack. In some embodiments, a security engine 340 can also generate a unified score based on the off-line and runtime scores.

It should be noted that, for some security services, only a run-time score is generated. For example, run-time scores may only be generated for security products 310 having an attack database with security rules that frequently change or services that do not operate on security rules. Each runtime or offline score can quantify the risk, or accuracy, or impact, threat coverage, or any combination thereof.

Each security engine 340 is configured to generate performance score(s) for handling a specific cyber-threat of a specific cyber-solution category. For example, the security service 350 belongs to an IDS cyber-solution category and the security engines 340 can individually handle the following types of threats: privilege escalation, network scan, and brute-force types of threats.

As another example, the security service 350 belongs to a reputation analysis category and the security engines 340 can individually handle the following types of threats: phishing web-sites, malware web-sites, and command and control web-sites.

Figure 4:
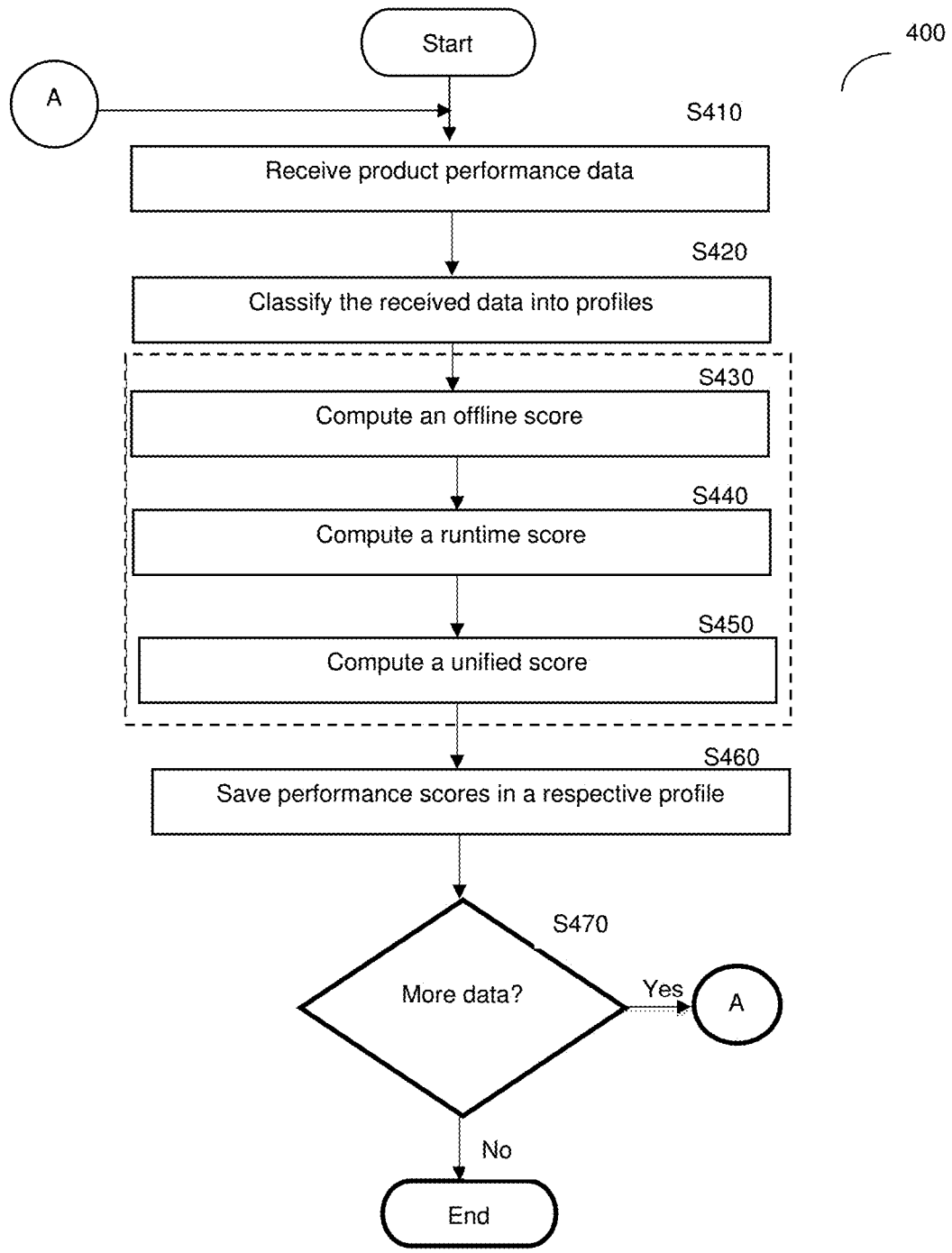
FIG. 4 is a flowchart illustrating a method for computing a performance score according to an embodiment.

FIG. 4 shows an example flowchart 400 illustrating a method for computing a performance score according to an embodiment. At S410, product performance data for each security product operable or deployed in an enterprise network is received. The product performance data includes, when available, security rules gathered from an attack database of the product and attack logs generated by the security product.

At S420, for each product, the received product performance data is classified into a respective product profile. In an embodiment, S420 includes normalizing the product performance data of each product into a unified representation. Classification of product performance data into product profiles is discussed in greater detail below with reference to FIG. 5. In an embodiment, S420 results with product profiles, per each security engine within a security service, including security-rules, attack logs, or a combination thereof, for the respective security products.

One or more performance scores are computed at S430 through S450. Specifically, at S430, for each product profile including security rules, an offline score is computed based on the security rules in the respective profile. In an embodiment, each offline score may be computed as a function of the following parameters: coverage, risk, and accuracy. The coverage parameter is a level of a threat protection coverage determined based on, for example, a number of security rules (e.g., attack signatures) in the attack database that are associated with the threat (i.e., with the security engine). The risk parameter is a risk level associated with a potential attack. The accuracy parameter is a level of a rule accuracy defined based on a confidence level associated by with the respective rule (the confidence level is defined by the product vendor). The accuracy level characterizes a potential false positive percentage associated with the product profile. An embodiment for computing the offline score is discussed in more detail below with reference to FIG. 6.

At S440, a runtime score is computed based on the attack logs associated with the respective profile. The runtime score is always preformed and will be the only performance score criteria in case that off-line security rules don't exist or are changing or updated relatively rapidly (e.g., every few hours or days). Examples for such security products include a threat intelligent reputation feed, anti-malware software, and the like.

In an example embodiment for a threat intelligence reputation feed (log), the runtime score is based on one or more the following parameters: confidence, popularity, age, and frequency. The confidence parameter defines the level of certainty that the feed includes a bad (e.g., 0=very bad site, 100=legit site). The popularity parameter is based on a number of world-wide incidents which led to the generation of reputation feed (in the log). The age represents the last time that the reputation entry (in the reputation vendor's DB) was updated. A frequency parameter is a function of the age and popularity parameters, which represents a measure of reputation intensity. Other parameters can be utilized in computing the runtime score. An example runtime score computation is provided below.

At S450, a unified score is computed as a function of the off-line and run-time scores. For example, the function may be a weight function, a threshold-based function (e.g., selecting the highest score between the two), a fuzzy logic function, and the like. When computing the unified score using a weight function, each of the offline and runtime scores are assigned with a predefined weight value that defines the relevance of each score per threat (security engine) for generating the unified score.

In an embodiment, the weights may be predefined. In another embodiment, the weights can be dynamically adapted based on a learning process. The learning process compares, for example, the offline score of a specific profile (i.e., product) in a specific customer network environment, to its run-time performance score over time. When, for example, the learned runtime score is relatively high, then the off-line score should have been assigned with a lower weight (and the opposite). This allows to generate a unified score based on the actual performance of the respective product over time in a specific network environment. The weights of the offline and runtime scores may be independent or a function of each other.

When using a fuzzy logic to compute the actual score fuzzy membership function edges (E1, E2 and E3) are defined respective of weights. That is, each such function represents a weight (high (H), medium (M), and low (L)). Then, using predefined following fuzzy-logic rules the unified score is computed for a product profile. Examples for such rules are provided in Table 1:

TABLE 1

| Logic | W1 | W2 | Total Score |
|---|---|---|---|
| AND | H | H | H |
| AND | H | M | M to H |
| AND | H | L | L to M |
| AND | M | H | M |
| AND | M | M or L | L |
| OR | L | L | L |

The rules in Table 1 assumes higher importance for W1 compared to W2.

At S460 the scores computed for the respective product profile are saved in the respective product profile.

At S470, it is checked if additional product performance data has been received. If so, execution returns to S410; otherwise, execution ends.

According to various disclosed embodiments, the various computed performance scores, e.g., unified, offline, and runtime scores can be utilized for selecting one security product to handle a specific threat. The decision of which scores to use for the selection may be based on the type of the security service.

In an embodiment, the product profile with the highest off-line score or a unified score is selected.

When the runtime score is used for selection of a product profile, a runtime score is assigned with an attack log. An association of an attack log with a respective runtime score is a signal. A selection process starts with selecting a first set of signals resulted by the various product profiles, of the same security engine, based on the following criteria: a time interval (e.g., selection of signal generated across different security products during a predefined time interval); a source (e.g., selection of signals generated across different security products that are with the same source host); a destination (e.g., selection of signals are generated across different products that are with the same destination host or remote host; a detection method (e.g., a detection method that generates the attack logs of the respective signals such as IDS method, Reputation-based method, Binary analysis method, and the like); a domain or URL (e.g., selection of signals generated across different security products with the same destination domain or URL); and an analyzed object (e.g., selection of the signals generated across different security products that analyzed the same object, where the analysis of objects can be identified based on file hash (MD5), etc.).

Thereafter, from the first group of signals, the best performing signals are selected based on a predefined threshold. The threshold may be based on a runtime score defined in the signals.

In another embodiment, the performance scores computed for the product profiles are utilized to benchmark security products. Based on the benchmarking, it can be determined which product demonstrates the best return on investment (ROI) and allow security managers to take educated decisions on which products to keep, renew, or remove from the system.

Figure 5:
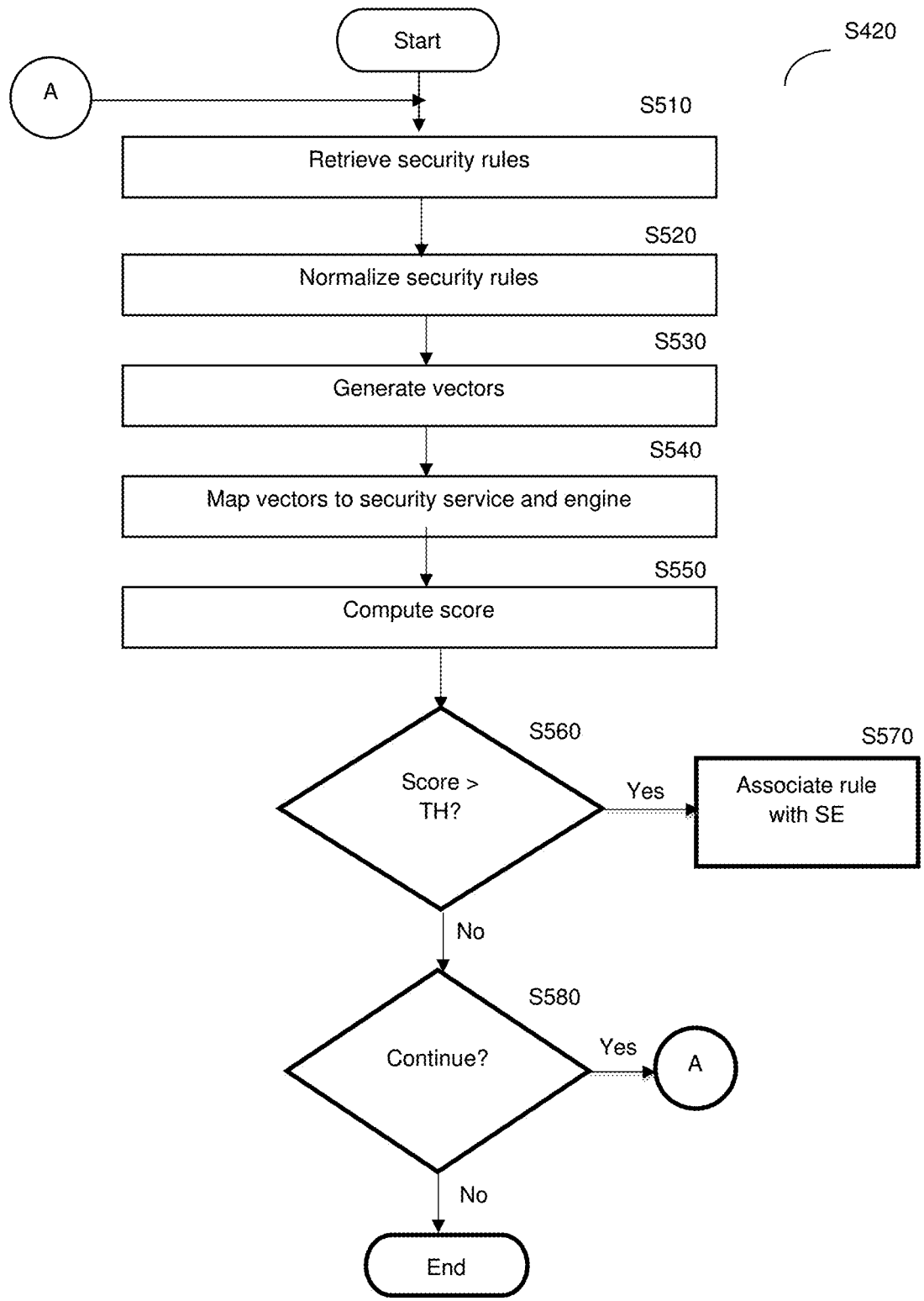
FIG. 5 is a flowchart illustrating a method for generating a classification model according to an embodiment.

FIG. 5 is an example flowchart S420 illustrating the classification product performance data according to an embodiment. As noted above, the product performance data may include security rules and attack logs both having a structured format. The classification of a security rule and attack log may be performed using the same method. For the sake of simplicity of the discussion, the classification method will be discussed with reference to classification of security rules.

At S510, security rules are retrieved from an attack database. In an embodiment, only certain fields of security rules are retrieved. Specifically, the retrieved fields include information that can result in a unique classification. Further, the retrieved fields may be determined based on weights assigned to such fields.

At S520, each retrieved security rule is normalized to result in a normalized string representing the security rule. The normalization may include converting all letters in each retrieved field security rule into a single representation (e.g., lowercase); removing stop-words which are not indicative of the security rule and/or threat; stemming words having the same root; and combinations thereof.

Following is an example for the normalization step. The field of a retrieved security rule is "summary" having the following description:

A web command execution attack involving the use of a "NMAP" command.

First the word "NMAP" will be converted to a lowercase word "nmap". Then, stop-words "A", "the", "of", "will", and "be" are removed. The words "execution", and "involving" are stemmed to "execute" and "involve", respectively. The resulting normalized string would be:

"web command execute attack involve use namp command";

The normalized string may be duplicated or repeated a few times depending on the importance of the field for the classification process. For example, the final string can be represented as follows:

"web command execute attack involve use"

Or a duplicated string "web command execute attack involve use nmap command web command execute attack involve use".

At S530, a vector representing the security rule is generated based on the indicative terms found in the normalized string. The indicative terms are retrieved from a threat vocabulary database (note shown). As noted above, the vector can be computed as a set of binary or numeric values. For example, if the indicative terms may be retrieved from a database in the following format {"nmap":1, "scan":2, "operating system":3, "icmp":4, "ping":5} which determines that the output vector would include only 5 entries, where the first element corresponds to presence of the term "nmap" in string, the second element corresponds to presence of the term "scan", and so on. In this example, the indicative terms are: "nmap", "scan", "operating system", "ICMP", and "ping" and the normalized string is as indicated above, a binary vector would be:

"1 0 0 0 0".

It should be noted that for ease of the discussion and understanding of the various embodiments, the provided example is only for one field in a security rule. A typical rule includes multiple fields.

At S540, a generated vector is mapped to a security engine of a security service. The mapping is performed based on a classification model. The classification model is developed during an off-line processing. The mapping may be statistical, deterministic, or heuristics-based mapping. As noted above, such classification is created per each security engine. In an embodiment, the rules including one or more indicative terms in common will be mapped (or classified) to the same security engine of a service.

To demonstrate the operation of S540, the following security rules will be mapped to a "network scan" security engine within the IDS security service. It should be noted that rules demonstrated herein are not presented in their normalized and vectorized representations merely for simplicity purposes and without limitation on the disclosed embodiments.

A security rule (security rule 1) from a security product A of a vendor X may be:
name: web-attacks nmap command attempt
summary: A web command execution attack involving the use of a "nmap" command
impact: Possible intelligence gathering activity.
Detailed Description: The attacker may have gained the ability to execute system commands remotely or the web server may be incorrectly configured to allow such access. This rule generates an event when a "nmap" command is used over a plain-text (unencrypted) connection on one of the specified web ports to the target web server. The "nmap" command may be used to discover open ports, services and operating system information on hosts. The rule looks for the "nmap" command in the client to web server network traffic and does not indicate whether the command was actually successful. The presence of the "nmap" command in the URI indicates that an attacker attempted to trick the web server into executing system in non-interactive mode i.e. without a valid shell session.

A security rule (security rule 2) from a security product B of a vendor X may be:
name: scan nmap TCP
summary: This event is generated when the nmap port scanner and reconnaissance tool is used against a host.
impact: This could be part of a full scan by nmap and could indicate potential malicious reconnaissance of the targeted network or host.
Detailed description: Some versions of nmap TCP ping, if selected, sends a TCP ACK with an ACK number=0. nmap can use TCP ping as a second alternative to icmp ping.

A security rule (security rule 3) from a security product C of vendor Z may be:
name: scan: Possible CyberCop OS Probe3
impact: Reconnaissance
description: This alert indicates that there is a potentially malicious attempt to identify the OS on a target host using TCP packets. This alert is triggered by TCP packets with SYN+FIN+URG flags, possibly caused by a scan event. All systems with a TCP/IP stack are vulnerable to this. A remote attacker could identify the operating system of a host based on how it reacts to some IP or ICMP packets, using a tool such as NMAP or Queso. The results of a scan by this utility could provide an attacker information about the weaknesses of your network and systems.

The indicative terms are for a network scan type of threat are "nmap", "scan", "operating system", "ICMP" and "ping". As both rules include the indicative terms "nmap" and "operating system", these rules are mapped to network scan security engine within the IDS security service.

At S550, a classification score is computed. The classification score indicates the accuracy of the classification (e.g., the probability that the rule was correctly mapped to a security engine). In an optional embodiment, S550 may include computing a percentage of "white list rules", "black list rules", or both, in order to verify the classification results. The percentage of the "white list rules", "black list rules", or both may be computed only when the number of classified rules are above a certain threshold.

At S560, it is checked if any or each of the classification score, the white list percentage, and the black list percentage is equal to or greater than a respective predefined threshold (TH). If so, execution continues with S570; otherwise, execution continues with S580. At S570, the security rule is associated with a product profile within a security engine (SE). Such association may be based in a database provided to a security engine, or both. Otherwise, the classification is ignored.

At S580, it is checked if there are additional security rules to classify. If so, execution continues with S510; otherwise, execution terminates.

The classification method is performed by a classifier (e.g., a classifier 250 or 330). An example structure of the classifier 330 is discussed in co-pending patent application Ser. No. 15/182,827, assigned to the common assignee, which is incorporated herein by reference.

Figure 6:
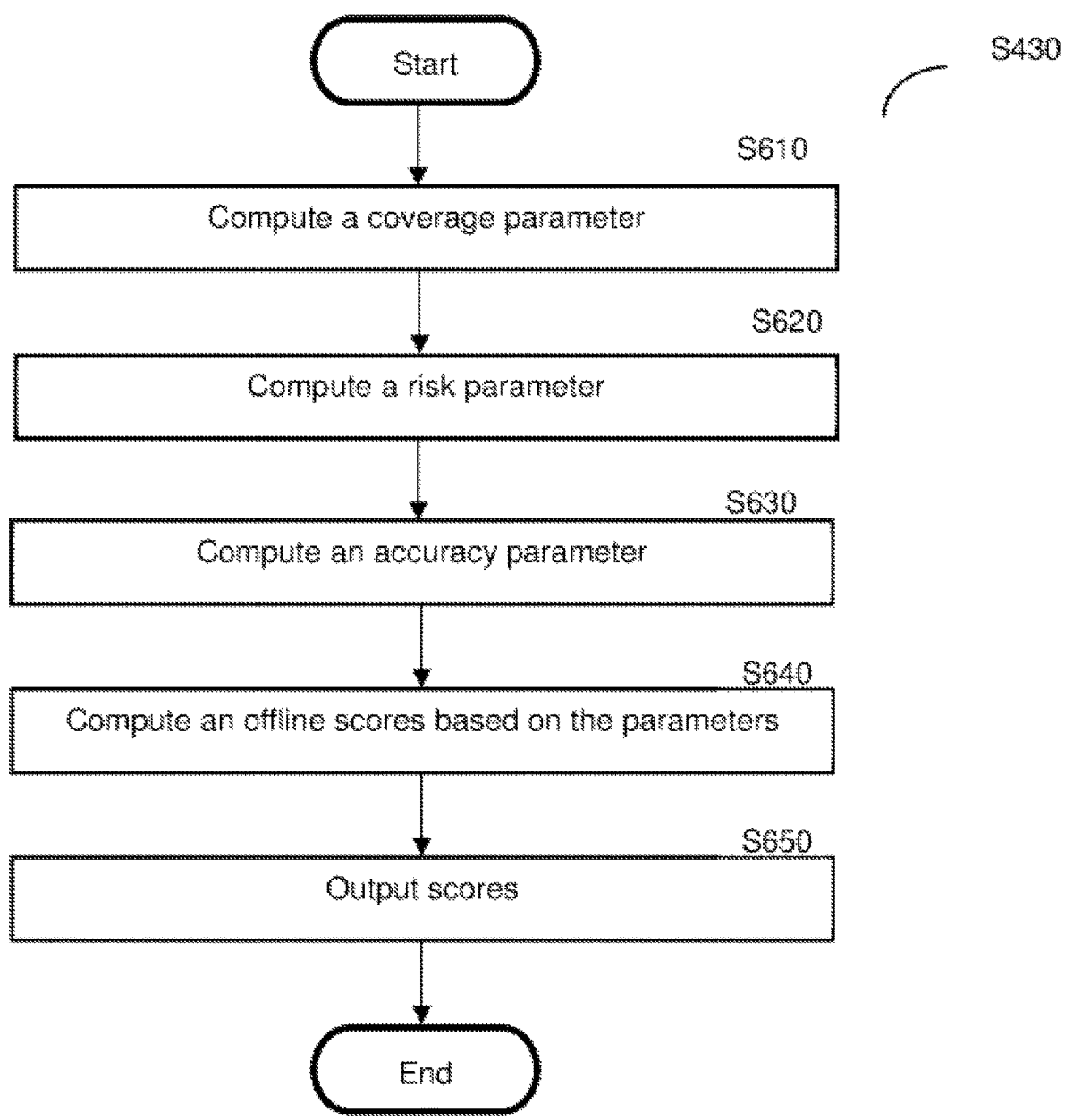
FIG. 6 is a flowchart illustrating a method for computing an offline score according to an embodiment.

FIG. 6 shows an example flowchart S430 illustrating a method for computing an off-line score according to an embodiment. The off-line score is computed over security rules (e.g., signatures, etc.) stored in the database.

At S610, a coverage parameter is computed. As noted above, the coverage parameter defines a level of a security threat coverage determined based on a number of security rules in the attack database or classified rules in product profile associated with a security engine.

In an example embodiment, for each product profile, the number of rules are counted ($Rule_{count}$) and the rule level ($Rule_{level}$) is determined based on the determined level. For example, if the $Rule_{count}$ is above a first threshold value, then the $Rule_{level}$ is set to High; if the $Rule_{count}$ is below a second threshold value, then the $Rule_{level}$ is set to low. As a non-limiting example, for IDS type of security products, the $Rule_{level}$ is determined as follows:

TABLE 1

| $Rule_{count}$ | $Rule_{count}$ <= 50 | $Rule_{count}$ <= 200 | $Rule_{count}$ > 201 |
|---|---|---|---|
| $Rule_{level}$ | Low | Medium | High |

When multiple product profiles for the same security engine exist, the relative coverage level ($Rel_{level}$) is set by sorting the products according to the number of rules in the associated security engine within the service. The $Rel_{level}$ can be set, for example, to a low, high, or medium value. Then, the coverage parameter is set according to the following function:

Coverage parameter=minimum [$Rel_{level}$, $Rule_{level}$]

This is the minimum between $Rel_{level}$ and $Rule_{level}$ computed for the product profile. In an embodiment, when only one product profile exists in the security engine, the coverage parameter is set equal to the $Rule_{level}$.

At S620, a risk parameter is computed. As noted above, the risk parameter is a risk level associated with a potential attack. In an embodiment, for each profile, a severity, an age, and a common vulnerabilities and exposures (CVE)) rules reference level are determined.

The severity level is based on a percentage of security rules assigned with high, low, and medium severity indications. The severity indication is defined by the vendor for each rule and represent the general level of threat the rule is associated with. If the severity indication is not designated with the respective rule, then the severity indication is set to a low value. In an embodiment, the severity level may include any of three different values (High, Medium, and Low), respectively set based on the percentage of security rules in the profile assigned with high, low, and medium severity indications.

The age level is based on a percentage of old and new security rules in a profile. The age of each rule is based on the its creation or last update date (defined by the vendor). If the creation or last update date is not designated with the respective rule, the rule is considered old. In an embodiment, the age level can have any of a high, medium, and low value, respectively set based on the percentage of security rules having creation/last update dates fall between 3 different time windows (e.g., less than a year, more than 3 years, and between 1-3 years). In general, old rules are typically considered less "dangerous" (i.e., with a lower risk) because systems (servers, client and network tools) have more time to be patched, and thus remove vulnerability against exploits that these rules can help to detect.

The CVE level is based on a percentage of rules in the security profile with a defined CVE reference level. In an embodiment, the CVE level can have any of a high, a medium, and a low value, where the value is set based on the percentage of rules that have it. If the CVE is not defined with the respective rule, the rule CVE level is set to low. In general, rules that are assigned with CVE(s) are considered with higher risk (more "dangerous") because it means that the vulnerability these rules are associated with it are known, and validated by the security community and the vulnerable vendors.

The risk parameter is computed as a function of the severity level ($Sev_{level}$), age level ($Age_{level}$); and CVE level ($CVE_{level}$). In an example embodiment, the following equations are utilized:

$$Risk_H = \text{MAX}(w_s \times Sev_H, w_a \times Age_H, w_c \times CVE_H)$$

$$Risk_M = \text{MAX}(w_s \times Sev_M, w_a \times Age_M, w_c \times CVE_M)$$

$$Risk_L = \text{MAX}(w_s \times Sev_L, w_a \times Age_L, w_c \times CVE_L)$$

$$Risk_{score} = \frac{Risk_L \times 1 + Risk_M \times 2 + Risk_H \times 3}{Risk_L + Risk_M + Risk_H}$$

$$Risk_{score} \geq \alpha = H$$

$$\beta < Risk_{score} \leq \alpha = H$$

$$\text{Else, } Risk_{score} = L$$

The weights $w_s$, $w_c$, and $w_a$ and the threshold values $\alpha$ and $\beta$ may be predetermined or dynamically assigned based on a learning process.

At S630, an accuracy parameter is computed based on a percentage of potential false positive associated with the overall created profile. In an embodiment, the accuracy parameter can have any of a high, medium, and low value set based on predefined threshold. For example, the accuracy parameter is set to high when the percentage of high confidence rules is over a high threshold (e.g., 80%); the accuracy parameter is set medium when the percentage of high confidence rules meets a medium threshold but is not over the high threshold (e.g., 50% to 80%); and the accuracy parameter is set to low when the percentage of high confidence rules is less than a low threshold (e.g., 50%). All thresholds are configurable.

At S640, the offline score is computed as a function of the accuracy parameter, risk parameter, and/or coverage parameter. In an embodiment, the function may be an average of the values of these parameters. In another embodiment, the function may be a weight function of the values of these parameters. At S650, the computed off-line score for each product profile is output.

The following is a non-limiting example for computing a runtime score for reputation-based security products according to an embodiment. In an embodiment, such products provide a security mechanism that classifies web sites (URLs), domains, IP addresses, and files (file hash) based on their gathered reputation. This allows for identification and prediction of, for example, if a file is safe, based on its overall use and reputation over a wide community of users.

A typical reputation service generates logs including reputation indications (or scores). Each reputation indication is complemented with an age, popularity, confidence, frequency, and location. Based on the information included in each log, one or more of the following parameters are determined: a confidence level, a popularity level, an age, a site reputation scope level, and a frequency level. In an embodiment, the geo location can be factored as well (particularly in case of IP addresses, and in to some extent for URL and Domain as well).

The confidence parameter level is set based on the value of a reputation indication (score) included in each log. In an embodiment, the confidence level may be set based on 4 levels: high, medium, low, and legitimate. For example, a high confidence level is set when the reputation indication is between 1 and 20; a medium level is set when the reputation indication is between 21 and 40; a low level is set when the reputation indication is between 41 and 80; and a legitimate level when the score is between 81 and 100. In an embodiment, the reputation indication is normalized by the classifier 250 or network interface 113 in order to compare between reputation logs of two or more reputation products within the same security engines. In another embodiment, the thresholds utilized to set the confidence level are set based on the vendor.

The popularity level parameter is set based on a number of indications which led to the bad reputation indication (score). That is, a high popularity number means that the subject of reputation (URL, IP etc.) is associated with more attack activities than a subject of reputation with low popularity. In an embodiment, the popularity level parameter can have any of a high, medium, and low value being set based on the number of indications. In an embodiment, the thresholds (or ranges) are set to the popularity level parameter is set based on the vendor.

The age level parameter is based on the time elapsed since the reputation record has been updated by the reputation vendor. In an embodiment, the age level parameter can have any of a high, medium, and low value being set based on the date of the last update of the reputation record. For example, a low age level will be set when the last update is more than a year and a high age level will be set when the last update is less than a month. In general, older records will typically represent a lower risk, as the associated threat may be no longer available.

The site reputation scope level parameter is based on a reputation result granularity. In an embodiment, the site reputation scope parameter can have any of a high, medium, and low value being set based on the granularity. For example, a high scope level will be set when the reputation indication is for a specific URL and a low scope level will be set for the entire domain (including all URLs associated with that domain). In general, high means more accurate characteristics of the subject of reputation (e.g., specific URL vs the entire domain).

The frequency level parameter is a function of the age and popularity parameters designated in the logs. This ratio represents a measure of intensity of the attacks indication associated with the subject of reputation. In an embodiment, the frequency level parameter can have any of a high, medium, and low value being set based on such ration.

The runtime score is computed as a function of any of or combination of: the frequency parameter, age parameter, confidence parameter, and/or popularity parameter. In an embodiment, the function may be an average of the or a weight function of the values of such parameters.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system connected to a plurality of security products via a network for activating one of the plurality of security products based on selecting the one based on a comparative scoring evaluation of each of the plurality of security products provided by a corresponding a plurality of vendors, comprising:
 a network interface layer communicatively interposed between a security stack and the plurality of security products comprising a plurality of drivers,
  wherein the plurality of drivers includes at least one driver for each of the plurality of security products,
  wherein at least two of the plurality of drivers is each assigned to only one of each of two of the plurality of security products, and
  wherein each of the plurality of drivers is configured for communications with a corresponding matched one of the plurality of security products for providing communications between the plurality of security products and the security stack by accommodating different forms of communication standards and different interfaces correspondingly associated with the plurality of vendors and correspondingly implemented by the plurality of security products, processing circuitry; and memory containing instructions that when executed by the processing circuitry cause the system to:

configure the security stack to protect a protected entity from a plurality of threats, each threat belonging to one of a plurality of threat categories, by orchestrating operations of the plurality of security products deployed to provide protection for the protected entity such that only one of the plurality of security products is activated at a given time to perform the protection, each of the plurality of security products configured to:
communicate information including attack logs identifying malicious and non-malicious activity on the network, and
maintain an attack database including security rules;

the security stack comprising a plurality of layers wherein each layer is communicatively interconnected through one or more APIs, the plurality of layers comprising:
a classifier layer, and
a security services layer,
wherein:
the classifier layer is communicatively interposed between the network interface layer and the security services layer, the classifier layer comprising a plurality of classifiers, wherein each classifier of the plurality of classifiers is configured to classify during runtime portions of the security rules from the plurality of the maintained attack databases and portions of the communicated attack logs into a unified representation of normalized security rules and normalized attack logs by extracting, from information received from the plurality of security products, corresponding portions of the received information from each of the plurality of security products into a corresponding one of the plurality of threat categories, and
wherein the extracted received information from the each classifier is routed to the security services layer in accordance with the corresponding one of the plurality of threat categories in a form corresponding to one of the unified representations classified by the plurality of classifiers,
the security services layer communicatively interconnected through one or more APIs to the classifier layer and comprising a plurality of security services wherein each security service of the plurality of security services corresponds to one of the pluralities of threat categories, the plurality of security services comprising one or more security engines, and one or more profiles, each profile corresponding to a corresponding one of the unified representations and to a corresponding security product of the plurality of security products, and
wherein each of the one or more security engines:
using at least a portion of the routed information, generates a performance score for each of the one or more profiles as a measure of an efficacy of the each of the one or more profiles for handling each of the plurality, of threat categories, and
collects each of the generated performance scores with
a corresponding of the each of the one or more profiles,
evaluate the collection to select a security product from the plurality of security products that is most capable of effectively handling the plurality of threats; and
activate over the network the selected security product to protect the protected entity and to be the only security product of the plurality of security products to be actively protecting the protected entity.

2. The system of claim 1, wherein the security stack further comprises:
a data plane layer communicatively interposed between the network interface layer and the classifier layer, the data plane layer configured to receive information generated by the plurality of security products.

3. The system of claim 1, wherein the security stack further comprises:
a security applications layer comprising the plurality of security products.

4. The system of claim 1, wherein using at least the portion of the routed information, generates the performance score for each of the one or more profiles as the measure of the efficacy of the each of the one or more profiles for handling each of the plurality of threat categories comprises:
generating an offline security score based on the security rules in the attack database; and
generating a runtime security score based on the attack logs, and
wherein the performance score is a unified score based on a function of the offline security score and the runtime security score.

5. The system of claim 4, wherein generating the offline security score based on the security rules in the attack database comprises:
generating at least one of a coverage parameter, a risk parameter, and an accuracy parameter for a security rule; and
generating the offline security score as a second function of at least one of the coverage parameter, the risk parameter, and the accuracy parameter for the security rule.

6. The system of claim 1, wherein classifying the portions of the security rules comprises:
normalizing at least one of the security rules;
generating a vector for the normalized security rule based on a set of terms indicative of a cyber-solution;
mapping the vector to a security engine; and
associating the at least one of the security rules with a profile of the one or more profiles.

7. The system of claim 1, further comprising:
a data plane unit communicatively interposed between the network interface layer and the security services layer, the data plane unit configured to provide functions that allow the plurality of security services to analyze the information.

* * * * *